United States Patent [19]

Shields

[11] Patent Number: 4,580,340

[45] Date of Patent: Apr. 8, 1986

[54] METHOD AND APPARATUS FOR APPLYING TWO PIECE CONNECTOR BLOCKS TO MULTICONDUCTOR CABLE

[76] Inventor: Charles E. Shields, 655 Woodland, Crystal Lake, Ill. 60014

[21] Appl. No.: 351,595

[22] Filed: Feb. 23, 1982

[51] Int. Cl.[4] ........................ H01R 43/04; B23P 19/00

[52] U.S. Cl. ........................................ 29/861; 29/749; 29/564.4

[58] Field of Search ........................ 29/749, 564.4, 857, 29/757; 83/42, 413, 649, 650, 732; 242/55, 79

[56] References Cited

U.S. PATENT DOCUMENTS 3,636,611 1/1972 Rosenbaum .
3,708,853 1/1973 Humen et al. .
3,789,482 2/1974 Ray .
4,043,017 8/1977 Folk et al. .
4,087,908 5/1978 Fusco et al. .................... 29/564.4 X
4,110,880 9/1978 Peppler et al. .
4,136,440 1/1979 Brandewie .
4,148,130 4/1979 Stauffer .
4,171,566 10/1979 Tominoi .......................... 29/564.4 X
4,253,222 3/1981 Brown et al. .
4,281,442 8/1981 Senior et al. ...................... 29/749 X
4,344,225 8/1982 Johnson, Jr. et al. .
4,373,261 2/1983 Long, Jr. ........................... 29/749 X
4,380,117 4/1983 Brandewie et al. .............. 29/749 X
4,409,734 10/1983 Baraglia ............................ 29/749 X
4,439,919 4/1984 Cheh et al. ............................ 29/861

FOREIGN PATENT DOCUMENTS 0052486 5/1982 European Pat. Off. .

*Primary Examiner*—Mark Rosenbaum
*Assistant Examiner*—Carl J. Arbes

[57] ABSTRACT

A method and apparatus is provided for attaching a plurality of two-piece connectors of varying configuration to a specified length of multi-conductor cable at precise locations along the length of the cable and in any sequence of connector attachment. A device is provided for storing and downwardly advancing a precise length of cable, cutting one end of the cable at a cutter station, and locating the cable between a connector assembly station where a pair of connector halfs are automatically attached to the cable at a precise, predetermined location. The cable is then laterally moved to one or more connector assembly stations where one or more additional connectors are attached to the cable. The cable is then moved back to the cutter station where the cable is cut flush against the top of the last connector to be attached to the cable. All drive and movement functions of the apparatus are controlled by a pre-programmed microprocessor.

48 Claims, 7 Drawing Figures

METHOD AND APPARATUS FOR APPLYING TWO PIECE CONNECTOR BLOCKS TO MULTICONDUCTOR CABLE

BACKGROUND OF THE INVENTION

1. Field of the Invention

The invention relates to a machine and the method for using the machine to apply two-piece connector blocks at specifically defined points on a precise length of multiple conductor cable.

2. Description of the Prior Art

In the electronics industry and computer field, and particularly in the field of minicomputers and microcomputers, it is necessary to utilize multiple lines or busses interconnecting several different elements on the same line as related equipment relys more and more on mass termination technique for interconnections between and among components. For example, it may be necessary to have a sixteen conductor cable for providing a sixteen conductor bus for communicating between a central data processing unit, a peripheral memory, and peripheral data monitoring devices. Such cables may also form a bus providing a coupling between a CPU, an address, a RAM and a ROM. In such use, the conductor cable requires a plurality of intermediate connectors at precise locations along the cable length to connect to elements of equipment in a specific geometric arrangement in the cabinet.

Typically, such a mass termination multiple conductor cable is a flat cable including a plurality of conductors (e.g., sixteen) in a parallel, standardized spaced array in the cable and embedded in or surrounded by flexible plastic insulating material. Also, to minimize the pickup of noise, an electrical shield (typically wire mesh or screen-type conductor) is placed over the insulated array of conductors and an insulating surface coating is applied over the electrical shield. Additionally, above the insulated plurality of conductors and in contact with the electrical shield there is usually positioned a system ground or system common conductor.

For particular assemblies which are produced in substantial quantities, large amounts of multi-conductor cable are required, having a precise length and having two or more connectors disposed at precise locations along each cable length, with at least one connector located at each end of the cable. In a typical application, the various connectors may be of different configurations for interfacing with different types or makes of equipment.

The connector blocks are produced in two mating pieces, and are adapted to be applied with the cable "sandwiched" between the connector half. Each connector has an elongate slot therein, and within the connector are a plurality of spaced apart contacter pins. These pins are spaced apart the same distance that the conductors in the cable are spaced from each other. Also, the first contacter pin is spaced a predetermined distance from one edge of the slot in the connector. When the connector half is properly positioned adjacent the cable, an actuator is operated to press the connector pins through the plastic cable layer and into contact with the individual conductors in the cable. The copper conductor is captured by the pins without shorting other wires. In the cable with which the present invention is adapted to be used, a plurality of connectors, several of which are of differing configurations, must be applied to the cable at precise locations along the cable length, with the proper type of connector being applied at its specified location. A connector may be male or female, and have front or side facing locations.

Prior methods for applying a plurality of connectors to a multi-conductor cable include manual operations. Manual operations are severely labor intensive, wherein the following procedure is currently in common practice.

(a) Cut the multi-conductor cable to length.

(b) Measure and mark locations for each connector along the cable length.

(c) Place one connector half in its proper position.

(d) Place the other connector half in position adjacent the one connector half, with the cable between the connector halfs.

(e) Place the connector halfs and cable in a fixture.

(f) Using an arbor press or a pneumatic press, apply pressure to the connector halfs until they are staked together and the connector pins have penetrated the insulation layer of the cable.

(g) Repeat the last four steps for each connector.

It is apparent that the cost of producing substantial numbers of cable and connector assemblies in this manner can be quite costly in terms of direct labor.

Additionally, it is common that connectors are located in an "up" or "down" position in relation to others on a cable assembly, or that different types of connectors are utilized on the same cable assembly. In the latter circumstances, different fixtures would be required to attach each type of connector to the cable assembly.

In addition, machines are utilized which advance the cable horizontally past a plurality of horizontally disposed stations where the cable is stopped and a connector attached. Such machines do not provide means for reversing the direction of the cable, which precludes the application of a previously applied type of connector at a point further along the length of the cable. In such devices, the catenary effect on the horizontally moving cable may affect the ability to precisely apply the connector at its specific location.

As will be described in greater detail hereinafter, the method and machine of the present invention enable one to precisely apply a plurality of connectors, of any desired type and in any desired array, to a length of multiconductor cable at precise locations along the cable length, and to prepare a plurality of identical cable segments with the same selected connectors mounted at the desired location along the length of each segment.

SUMMARY OF THE INVENTION

According to the present invention there is provided a method and apparatus for attaching two-piece connectors of varying configuration to a sepcified length of multi-conductor cable at precise locations along the length of the cable and in any given sequence of connector attachment. In particular, the invention provides a method for continuously and automatically forming cable assemblies, whereby each cable assembly comprises a precise length of a flat multi-conductor cable and at least two two-piece connectors attached to the cable at precise locations along the length of the cable, the method comprising the steps of: feeding the cable downwardly from a cable supply reel to a cutter station; cutting the lower end of the cable to establish a precisely located first end of the cable; feeding the cable downwardly by a first given distance from the level of the end of the cable; moving the cable laterally to a first connector feed assembly station; attaching a first two-piece connector on the lower end of the cable at the first connector feed assembly station, feeding the cable downward a second given distance from the first two-piece connector; attaching a second two-piece connector to the cable; moving the cable supply laterally to the cutter station; and cutting the cable flush with the upper edge of the second two-piece connector.

The invention also provides an apparatus for continuously and automatically forming cable assemblies, whereby each cable assembly comprises a precise length of a flat multi-conductor cable and at least two two-piece connectors attached to the cable at precise locations along the length of the cable, the apparatus including a first drive motor to feed the cable downwardly from a cable supply reel to a cutter station, a blade assembly to cut the lower end of the cable to establish a precisely located first end of the cable, a second drive motor to move the cable laterally to a first connector feed assembly station after the cable has been moved downwardly by the first drive motor a first given distance from the level of the end of the cable, connector feed devices at the first connector feed assembly station for attaching a first two-piece connector on the lower end of the cable at the first connector feed assembly station, a second connector feed assembly station for attaching a second two-piece connector to the cable after the cable has been fed downwardly a second given distance from the first connector by the first drive motor and after the cable has also been moved laterally by the second drive motor to the second connector feed assembly station, the cutter station being adapted to cut the cable flush with the upper edge of the second two-piece connector after the first drive motor has fed the cable downward a third given distance and the second drive motor has moved the cable laterally to the cutter station.

DESCRIPTION OF THE PREFERRED EMBODIMENT

Figure 1:
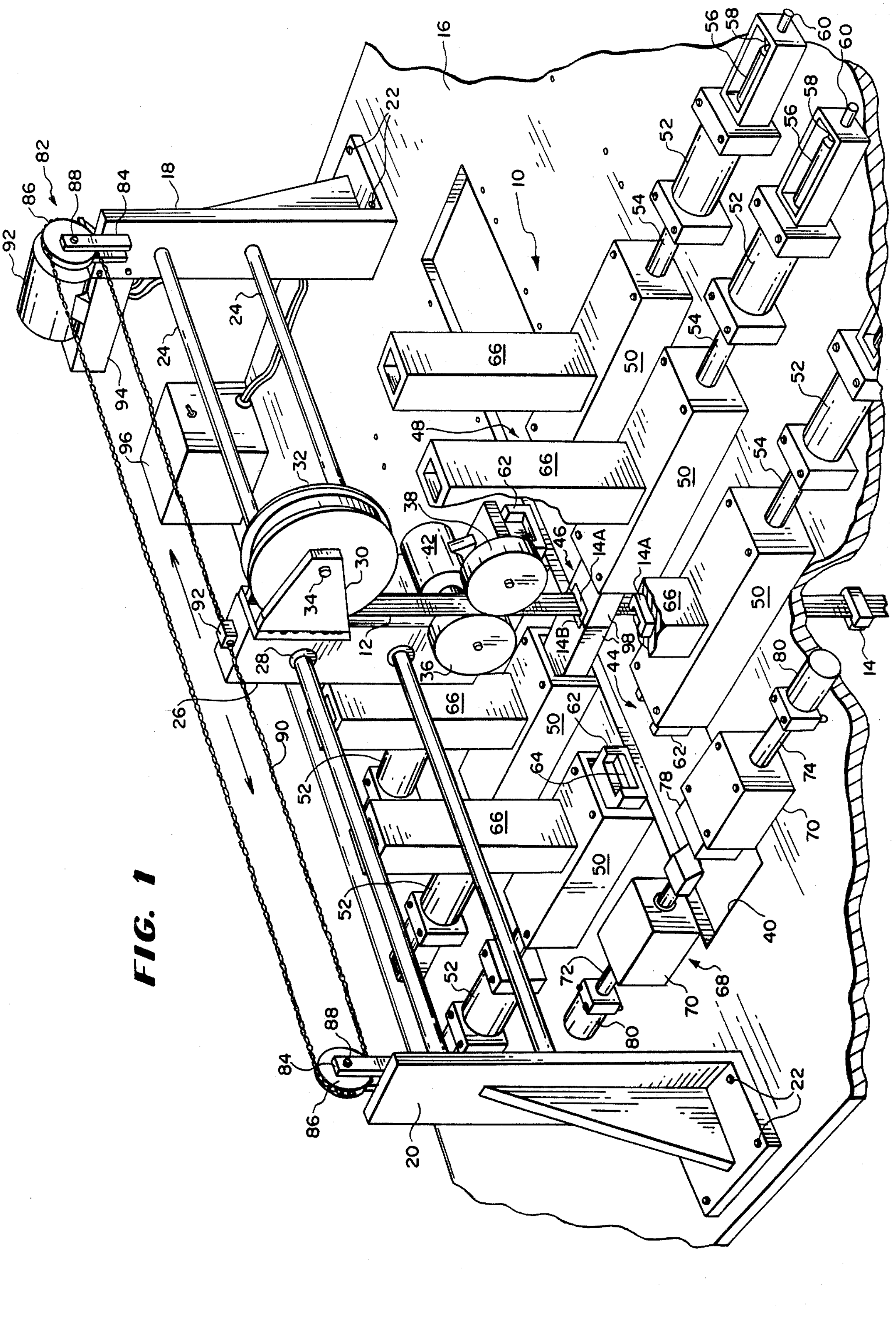
FIG. 1 is a perspective view of the machine of the present invention showing the various stations at which a plurality of connectors are applied to a multi-conductor cable, and the means for moving the cable between the various stations and ultimately to a cut-off station.
Figure 2:
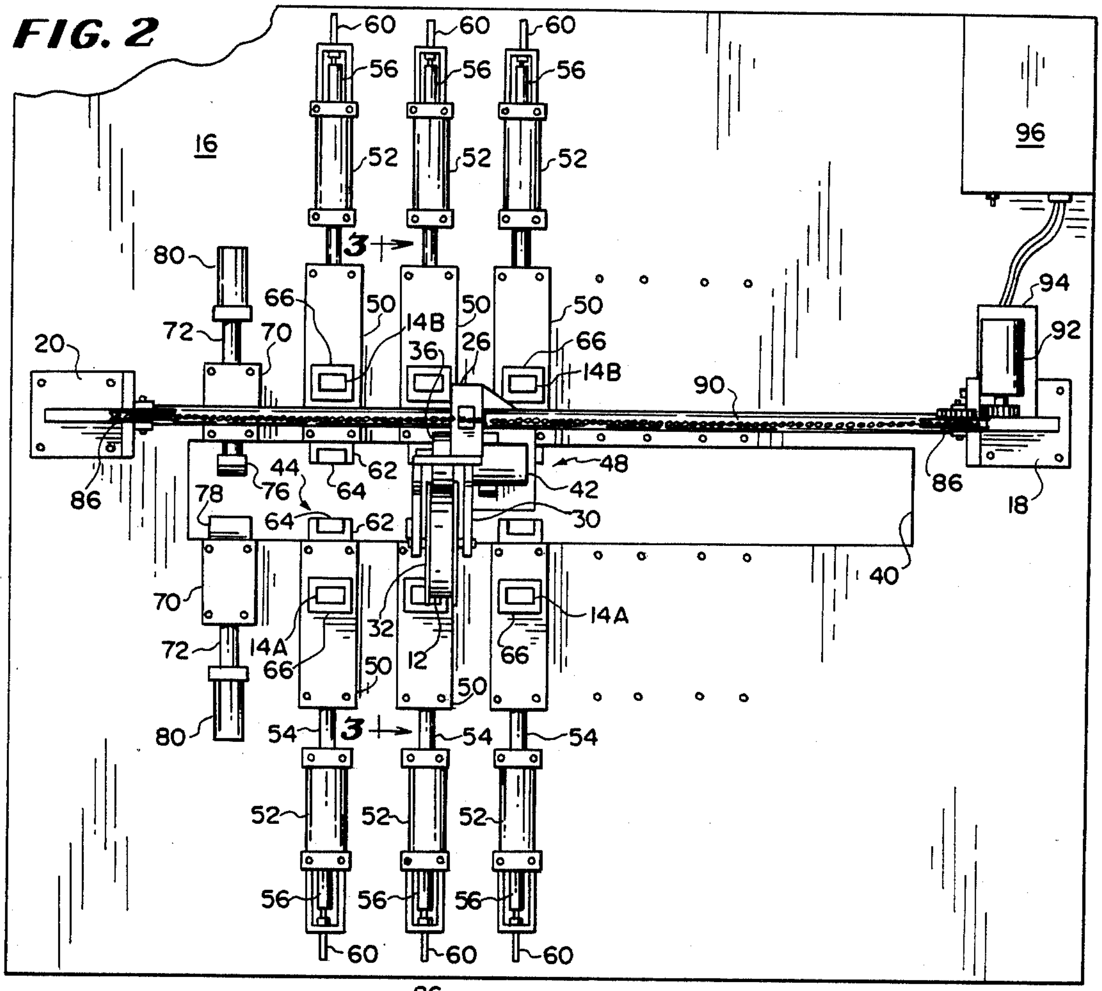
FIG. 2 is plan view of the machine illustrated in FIG. 1.
Figure 3:
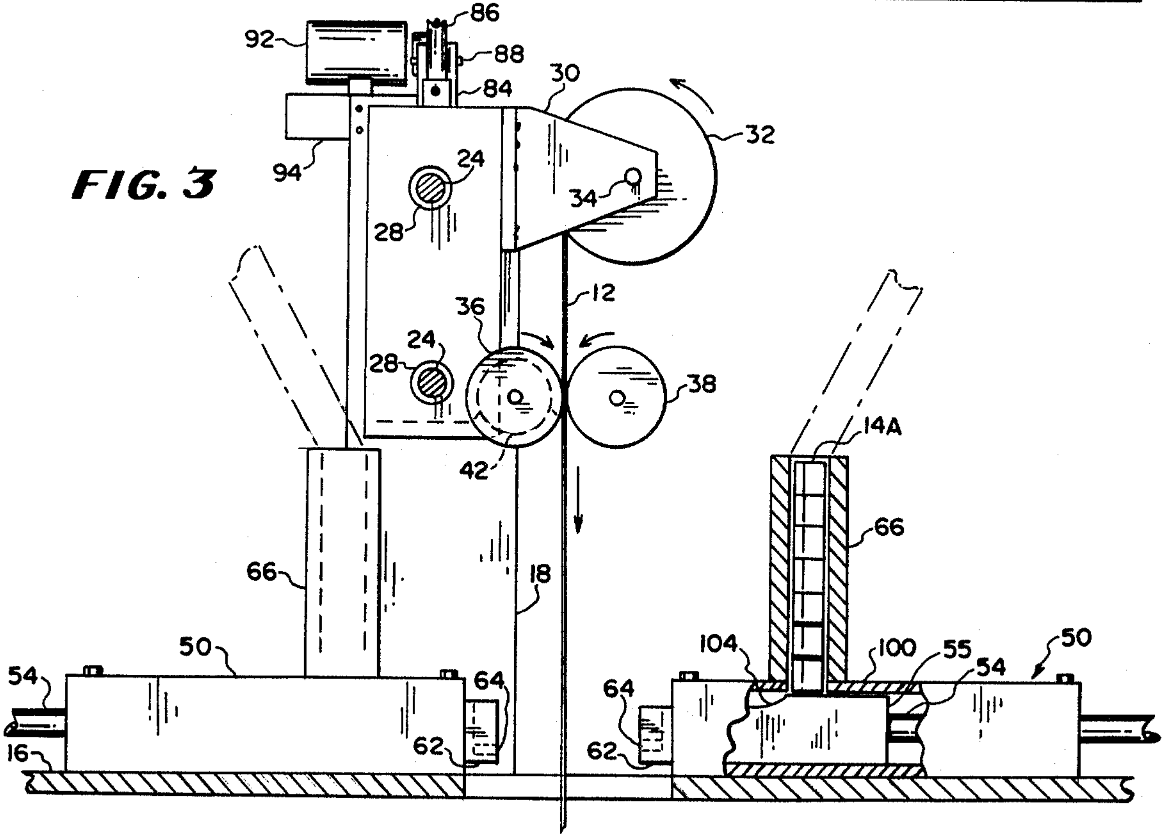
FIG. 3 is a partial sectional and cut-away view of the machine illustrated in FIG. 2 taken along the line 3—3, in particular showing the relationship between the reel of multiconductor cable, the cable itself, and the connector half feed devices disposed on either side of the cable.

Referring now to the drawings in greater detail, there is illustrated in FIG. 1 a machine 10 constructed in accordance with the teachings of the present invention. As will be described below, the machine 10 is particularly adapted for feeding a multi-conductor cable 12 past a plurality of stations where connectors 14 are applied to the cable 12 at precisely defined locations. The machine 10 is adapted to apply the connectors 14 to both ends of cable 12, and at any intermediate point along the cable length.

The connectors 14 comprise two halfs,14A and 14B. Each connector 14 has a slot therein for receiving the length of cable 12, and a plurality of pin-type contacters therein which, when the cable 12 is sandwiched between the connector halves 14A, 14B, are caused to penetrate the insulation surrounding cable 12 and into electrical contact with the plurality of conductors within the cable 12.

The machine 10 is mounted on a flat support surface 16 and includes two upstanding, opposed mounting plates 18, 20 which are firmly attached to support surface 16 by means of bolts 22. A pair of rods 24 extend between mounting plates 18 and 22, and provide a track for horizontal movement of cable mounting plate 26 in the directions shown by arrows in FIG. 1. Bushings 28 provide ease of movement of mounting plate 26 along rods 24.

A pair of brackets 30 extend laterally from cable mounting plate 26, and a reel 32 with built-in tension control is rotatably mounted on a pin 34 extending between the brackets 30. Multi-conductor cable 12 is carried by reel 32, and the cable 12 extends downward, under the influence of gravity, from reel 32 past two opposed cable feed rollers 36, 38 and through a large slot 40 in support surface 16. Feed roller 36 is selectively driven by motor 42 which is mounted on support surface 15. Roller 38 is an idler roller, but is so disposed that driving contact is provided to cable 12 as it passes between roller 36 and roller 38. For purposes to be explained, motor 42 is precisely controlled to drive cable 12 downward at specified increments such that connectors 14 can be applied to cable 12 at precise, pre-selected locations along the length thereof.

A plurality of piston or ram operated connector feed assemblies 44, 46, 48 are positioned at a plurality of stations along opposing sides of slot 40 and on support surface 16. In the disclosed embodiment, three connector feed assemblies are illustrated, but it is to be understood that any number of similar assemblies can be utilized in keeping within the teachings of the present invention.

Figure 4:
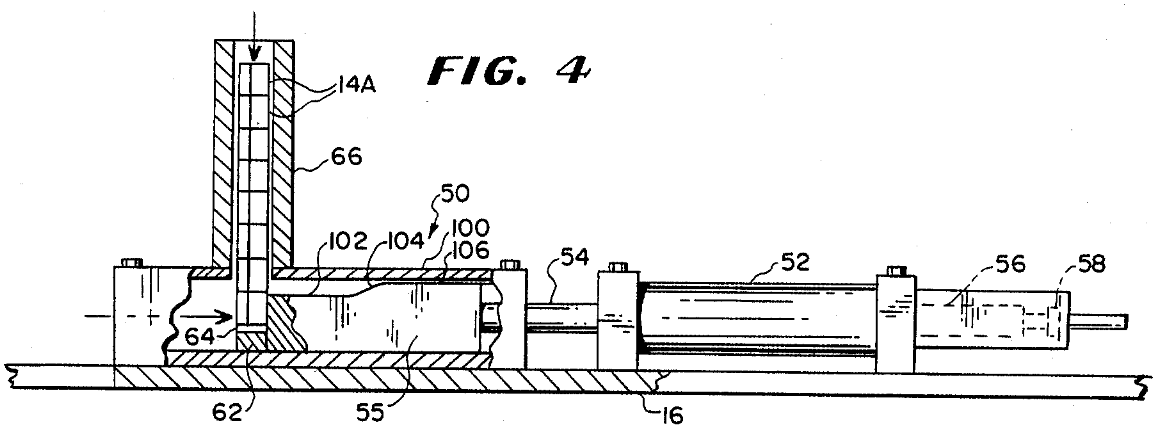
FIG. 4 is a detail, partial cut-away view of one of the connector half feed devices forming part of the present invention, shown in its position ready to feed a connector half into attachment on the multi-conductor cable.

Each connector feed assembly 44, 46, 48 includes a pair of opposed ram-type feed devices 50, wherein each pair of opposed feed devices 50 defines a station for the application of a connector 14 to cable 12. Pneumatic drive devices 52 are operatively connected to each ram-type device 50 for advancing rods 54 forward and towards each opposing counterpart rod 54. Each rod 54 moves a piston member 55 located within device 50 (FIG. 4). The pneumatic drive devices 52 are selectively controlled by solenoids 56, which include manually adjustable spacers 58 to adjust the length of stroke of each rod 54. Air under pressure is supplied to each pneumatically driven device 52 through conduit 60.

The forward end of each piston member 55 includes a head 62 which is adapted to hold an interchangeable insert 64, which is manually placed in head 62 depending upon the outside configuration of the connector 14 which is being applied to cable 12 at the specific station. Opposed heads 62 are adapted to be moved towards each other by feed devices 50, in the manner illustrated by connector feed assembly 46 in FIG. 1.

A connector feed magazine 66 is disposed atop each feed device 50, and holds a plurality of connector halves 14A or 14B in a vertical array above feed device 50. In the present invention, each magazine 66 on one side of slot 40 will hold one half (14A) of a connector assembly, while the opposing magazine will hold the other half (14B) of the same connector assembly. Feed devices 50 are adapted, when solenoids 56 are actuated, to sequentually place a connector half in insert 64 of head 62. As piston 55 is driven rearward, the subsequent connector half 14A or 14B in the vertical array in magazine 66 drops into insert 64. As rod 54 is then driven forward, opposing heads 62 meet and force connector halves 14A and 14B into mating relation and into electrical contact with the conductors inside cable 12.

An automatically controlled cutter head assembly 68 is located at one end of slot 40 adjacent the array of stations comprising connector feed assemblies 44, 46 and 48. Cutter assembly 68 comprises a pair of opposed piston rod housings 70, each having a piston rod 72, 74 slidably extending therethrough. At the end of rod 72 is a flat bottomed cutting blade 76, and at the opposed end of rod 74 is a bearing block 78. As will be described, when it is desired to cut a length of cable 12 with connectors 14 attached from reel 32, the cable is moved between blade 76 and bearing block 78. A pair of solenoids 80 are actuated which drive blade 76 and bearing block 78 towards each other, thereby cutting cable 12. Because of the flat bottom of blade 78, cable 12 is cut flush with the upper surface of the last, or end connector 14 applied to cable 12.

To move cable mounting plate 26 laterally along rods 24, chain drive mechanism 82 is provided which comprises a pair of mounting brackets 84 extending from each mounting plate 18, 20. A pair of pulleys 86 is mounted on a pin 88 between each pair of brackets 84, and a chain 90 extends over the pulleys and between mounting plates 18, 20. The chain 90 is securely fastened to block 92, which is fixed to the top of cable mounting plate 26.

One pulley 86 is driven by a step motor 92 mounted on a platform 94 fixed to mounting plate 18. Step motor 92 is controlled by a microprocessor control device 96 whereby the precise lateral location of cable 12 is controlled by microprocessor 96 and step motor 92. An air cylinder and associated control device can be used in place of step motor 92 within the scope of the present invention to drive chain 90.

Microprocessor 96 also controls cable feed motor 42, solenoids 56, and cutter solenoid 80 through suitable electrical connections (note shown). Thus, the entire operation of the disclosed machine can be pre-set to produce large quantities of multi-conductor cable with connectors attached all in precisely the same location on each cable.

Figure 5:
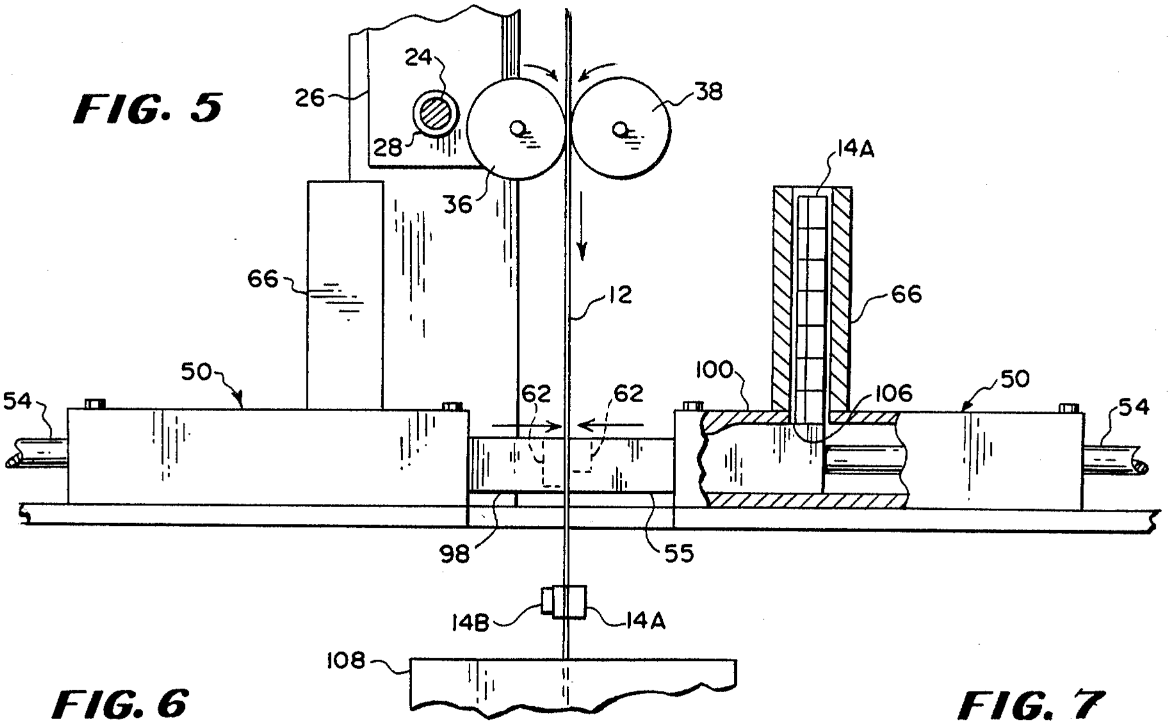
FIG. 5 is a detail, partial cut-away view of two opposed connector half feed devices, showing the position of each when a pair of connector halves are being attached to a multi-connector cable.

Referring to FIGS. 4 and 5, the details of ram type feed devices 50 are illustrated. Each ram device includes a piston member 55 which slides in a housing 100 under the control of rod 54 and pneumatic drive device 52. Ram head 62 forms the forward part of piston 55, and is adapted to hold inserts 64 corresponding to the outer configuration of connector halfs 14A aligned in magazine 66. The upper surface of piston 55 comprises a cut-out portion 102 which terminates at a curved face 104 of piston 55. Each opposing ram device is constructed in the same manner, and opposing magazines 66 store connector halves 14B.

Figure 6:
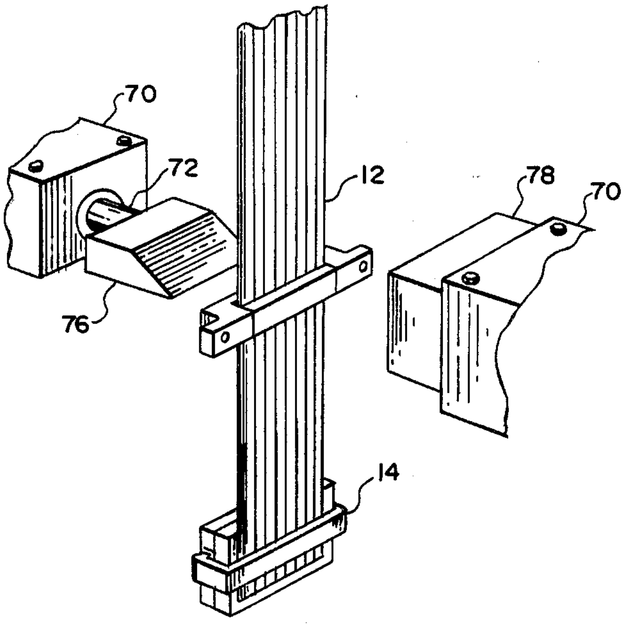
FIG. 6 is a perspective view of the cutter blade and bearing block forming part of the present invention, showing each in its position prior to cutting the cable with connectors attached.

In the operation of the disclosed invention, to be more fully explained below, piston 55 is driven to the left, as viewed in FIGS. 5 and 6, by rod 54 and pneumatic drive device 52. As insert 64 passes beneath magazine 66, the bottommost connector half 14A drops into the insert 64. Cut-out portion 102 is so designed that only one connector half 14A drops into insert 64. As piston 55 continues its movement leftward, the next connector half 14A in magazine 66 rides on the upper surface of cut-out portion 102 and rides on curved portion 104 of piston 55. When piston 55 has completed its leftward movement, and is in position to attach connector 14A to cable 12 and corresponding connector half 14B, as shown in FIG. 6, subsequent connectors 14A ride on the outer surface 106 of piston 55. When piston 55 is withdrawn to the right in the position shown in FIG. 5, the next connector half 14A drops into insert 64 under the influence of gravity and the cycle is repeated.

Pneumatic drive devices 52 are controlled by solenoids 56, as previously described. Each solenoid 56 includes an adjustable spacer unit 58. By adjusting spacer unit 58, the length of stroke of piston 55 can be varied to correspond to the thickness of the various connectors which are disposed in magazines 66.

In operation, magazines 66 are each filled with the selected connector halves 14A, 14B, to be applied to cable 12, and the appropriate cable 12 is inserted on reel 32. Also, inserts 64 corresponding to the outer configuration of connector halves 14A and 14B are placed in ram heads 62. Next, microprocessor 96 is initially programmed to (1) operate motor 42 such that a desired length of cable 12 is fed from reel 32; (2) operate motor 92, in forward and reverse, according to the sequence in which the varied connectors 14 are to be applied to cable 12; (3) actuate solenoids 56 in the proper sequence when cable mounting plate 26 has moved reel 32 and cable 12 adjacent the desired ram head 62 and appropriate connector 14; and (4) actuate solenoids 80 when the cable 12 has reached its proper length and the end connector 14 has been applied to the cable 12.

The microprocessor 96 operates the machine 10 in the following manner. Initially, to establish the uniformity of length of each cable produced by machine 10, motor 42 is actuated to feed cable 12 between feed rollers 36, 38 and through slot 40 under the influence of gravity. The cable 12 extends only a short distance beneath slot 40 for this initial operation. Motor 92 is then actuated to move cable mounting plate 26 along rods 24 until cable 12 is adjacent cutting blade 76. Solenoids 80 are then actuated, whereby the portion of cable 12 extending below slot 40 is cut off as blade 76 moves toward bearing block 78. The production of large quantities of multi-conductor cable of uniform length, with connectors attached can now commence.

To begin the production phase of operation, motor 42 is again actuated by microprocessor 96, or a manual override switch associated therewith, to rotate feed roller 36 and drive cable 12 downward a first precise length from reel 32 and between rollers 36, 38. When the preselected length of cable 12 reaches the point where the first connector 14 is to be applied to the cable, motor 42 automatically stops, and the cable 12 is held firmly between rollers 36, 38. Step motor 92 then drives chain 90 to position cable mounting plate 26 and cable 12 adjacent the connector feed assembly 44, 46, or 48 corresponding to the location where the appropriate magazine 66 is holding the first connector halves 14A and 14B to be applied to cable 12. When cable 12 is adjacent the proper first connector assembly station, microprocessor 96 stops motor 92. It is apparent from FIG. 1 that motor 92 can drive cable mounting plate 26 in either of the directions designated by the arrows.

After cable 12 is adjacent the selected connector feed assembly 44,46, or 48 the corresponding solenoids 56 on both sides of slot 40 are actuated, causing opposed rods 54 and pistons 55 to move towards each other. As each ram head 62 passes beneath magazine 66, a connector half 14A, is engaged by insert 64 in the ram head 62 and moves towards cable 12.

Simultaneously, the opposed connector half 14B is likewise engaged by opposed insert 64 and moved toward the opposite side of cable 12. As the ram heads 62 meet in the center of slot 40, cable 12 is sandwiched between connector halves 14A and 14B. Continued pressure supplied by pneumatic drive devices 52 pushes the contactor pins in the connector halves 14A, 14B through the insulation surrounding cable 12 and into contact with the conductors in cable 12. In addition, the two connector halves are forced together whereby fastening means engage each other and snap into an interconnecting relation. After an appropriate time lag, as determined by microprocessor 96, opposing solenoids 56 are actuated to withdraw pistons 55 and ram heads 62 from contact with each other. Each ram head 62 is then moved into the housing 100 of feed device 50, (FIG. 4,5) whereby head 62 is moved behind the bottom of magazine 66 to be in position to engage and insert a subsequent connector half. The withdrawal of the ram heads 62 triggers a switch in feed device 50 indicating to microprocessor 96 that a connector 14 has been attached to cable 12.

After the first connector 14 has been attached to the cable 12, microprocessor 96 next signals motor 42 to feed cable 12 downward a second precise length from reel 32, until the preselected cable position for attachment of the subsequent connector 14 is adjacent the line of ram heads 62. Motor 42 is then stopped, and motor 92 is activated to move cable mounting plate 26 along rods 24 until cable 12 is adjacent the connector feed assembly 44, 46, or 48 which has the preselected second connector halves in magazines 66. Motor 92 is then stopped, and microprocessor 96 functions to actuate solenoids 56 corresponding to the connector feed assembly 44, 46, or 48 in front of which cable 12 has been positioned. Solenoids 56 operate pneumatic drive devices 50 in the manner described above, whereby connector halves 14A and 14B are removed from their corresponding magazine 66 by ram heads 62 and attached to cable 12 in the same manner as described above.

In like manner, additional connectors 14 are attached to cable 12 by moving cable 12 adjacent the appropriate connector feed assembly, in any desired sequence, to the right or to the left, under the control of motor 92 and microprocessor 96. The operations described above are repeated until the sufficient number of connectors 14, in a predesignated sequence, are attached to cable 12. The present invention permits connectors 14 to be attached to the cable 12 at any point, and in any sequence. The cable 12 can even be operated to attach the same type of connector 14 from the same magazine 66 to the cable at subsequent locations, an operation which is not possible in prior horizontal feed multi-conductor cable assembly devices.

Figure 7:
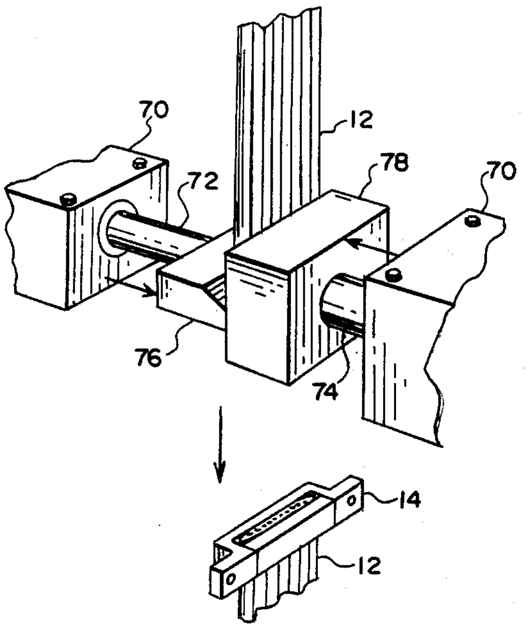
FIG. 7 is a perspective view of the cutter blade and bearing block of the present invention, showing the blade and bearing block in their respective positions after the cable has been cut immediately adjacent the end of the final connector attached to the cable.

After the pre-designated number of connectors 14 have been staked or attached to cable 12, microprocessor 96 sends a signal to motor 92 to drive cable mounting plate 26 laterally whereby cable 12 is stopped directly adjacent cutting blade 76 and bearing block 78. This is best understood by referring to FIGS. 6 and 7. Solenoids 80 are then actuated by microprocessor 96 to move blade 76 and block 78 towards each other and towards cable 12. At this stage, cable 12 has been moved vertically downward from its position for attachment of the last connector 14, whereby the top of last connector 14 is directly in line with the flat underside of cutting blade 76 (FIG. 6). As blade 76 moves toward block 78, cable 12 is cut at a precise point immediately above the last connector 14 on the cable, resulting in a flush, trim edge at the end of the cable 12 (FIG. 7). The detached cable 12, with connectors 14 attached, falls into a receptacle 108 (FIG. 5) beneath machine 10 where they are stored until needed. A sensor is actuated when the cable 12 is cut by block 76 to indicate to microprocessor 96 that one cycle of operation has been completed, and that a subsequent cycle should be initiated.

The above process is repeated until the predetermined number of assemblies of uniform length, with connectors 14 attached, are produced. Microprocessor 96 contains the program which will cease operation of machine 10 when the correct production quantity has been reached.

By way of example, the above-described machine 10 can be operated to produce cable assemblies at less than one second per connector, while cable is being fed at 48 inches per second, and the cutting step takes 0.5 seconds.

Through the use of microprocessor control 96, the operator can input the distance between connectors, the type and position of connector to be attached, the cut operation, and the total number of assemblies required. Additionally, the microprocessor 96 has the capacity to store programs for re-use, calculate number of connectors used of each type, length of cable used, length of cable remaining, number of assemblies completed, and number of assemblies to complete.

It will be apparent from the foregoing description that the method and apparatus of the present invention for producing cable assemblies provide a number of advantages, some of which have been described above and others of which are inherent in the invention.

Also it will be apparent that modifications can be made to the method and apparatus of the present invention without departing from the teachings of the present invention. Accordingly, the scope of the invention is only to be limited as necessitated by the accompanying claims.

I claim:

1. A method of forming cable assemblies comprising:
advancing a cable vertically downward a first selected distance;
attaching a first connector to the cable;

advancing the cable vertically downward a second selected distance;

attaching a second connector to the cable the second selected distance from the first connector;

advancing the cable vertically downward a third selected distance; and, attaching a third connector to the cable the third selected distance from the second connector.

2. A method of attaching electrical connector parts to a flat, multiconductor cable, the method comprising:

providing a supply of connector parts;

receiving individual connector parts from the connector part supply in a connector part receiving member;

advancing the connector part receiving member into contact with a portion of the flat, multiconductor cable and staking the connector part thereto; and, selectively repeating the connector part receiving and staking steps to stake a plurality of connector parts to the flat, multiconductor cable.

3. A method of attaching a plurality of types of connectors to a ribbon cable, the method comprising:

advancing the ribbon cable;

receiving a first type of connector in a first connector staking member;

advancing the first connector staking member toward the ribbon cable and staking the first type of connector thereto;

bringing the ribbon cable and a second staking member into an adjacent relationship;

receiving a second type of connector in the second staking member; and, advancing the second staking member toward the ribbon cable and staking the second type connector thereto.

4. A method for continuously and automatically forming multiconductor cable assemblies, the method comprising:

intermittently advancing a length of multiconductor cable longitudinally;

sequentially translating the cable length transversely among a plurality of connector attachment stations and a cutting station;

sequentially attaching a plurality of connectors to the cable length at the connector attachment stations; and, cutting the cable length at the cutting station to define a terminal end thereof.

5. A method for continuously and automatically forming cable asemblies, each cable assembly including a precise length of cable upon which connectors are attached, the cable being supplied from a cable supply, and the connectors being attached to the cable at at least one connector attachment station positioned vertically below the cable supply, the method comprising:

translating the cable supply horizontally to position the cable supply directly above the connector attachment station;

advancing cable from the cable supply vertically downward such that at least a first selected portion of the cable is positioned adjacent the connector attachment station; and, attaching at least one connector to the cable, the attaching step including:

storing a plurality of mating connector halves in magazines located on either side of the cable at the connector attachment station;

removing a pair of mating connector halves from the magazines when the cable is adjacent the connector attachment station;

moving the connector halves into positions opposite each other with the cable therebetween; and applying pressure to the connector halves, whereby the connector halves are staked to each other and a series of pins in one connector half penetrates the insulation of the cable and the pins contact one or more conductors in the cable.

6. A method for continuously and automatically forming cable assemblies, each cable assembly including a length of cable upon which at least two connectors are attached, the cable being supplied from a cable supply, and the connectors being attached to the cable at a plurality of connector attachment stations positioned vertically below the cable supply, the plurality of connector attachment stations including at least a first connector attachment station and a second connector attachment station, the method comprising:

intermittently translating the cable supply horizontally among at least the first and second connector attachment stations;

vertically advancing the cable downward from the cable supply to position selected portions of the cable adjacent the connector attachment stations; and, attaching at least one connector at the first connector attachment station, and attaching at least one connector at the second connector attachment station; said step of translating the cable supply being performed at least between said step of attaching the at least one connector at the first connector attachment station and said step of attaching the at least one connector at the second connector attachment station.

7. A method for continuously and automatically forming cable assemblies where each cable assembly is of a precise length and comprises a plurality of connectors attached at a plurality of different portions of the cable assembly, said method comprising:

(a) supporting a cable supply for paying out cable at desired and intermittent intervals;

(b) advancing the cable a first time from the cable supply in a vertically-downward direction to a connector feed assembly station positioned below the cable supply until a first given portion of the cable is positioned at and aligned with the connector feed assembly station;

(c) attaching a first connector to the first portion of the cable positioned thereat;

(d) advancing the cable a second time after the first connector has been attached to position and align a second portion of the cable at a connector feed assembly station;

(e) attaching a second connector at a connector feed assembly station to the second portion of the cable;

(f) advancing the cable a third time after the second connector has been attached to position a third portion of the cable at a connector feed assembly station; and (g) attaching a third connector at a connector feed assembly station to the third portion of the cable, whereby a cable length having three connectors attached thereon is produced.

8. The method according to claim 7, further comprising the step of initially cutting the cable before said step of advancing the cable a first time in order to define a first leading end of cable assembly.

9. The method according to claim 7, further comprising the step of terminally cutting the cable after said step of attaching a third connector at a portion thereof above that portion at which the third connector was attached.

10. The method according to claim 7, in which there are provided a plurality of in-line connector feed assembly stations, said method further comprising the step of moving intermittently the cable supply between connector feed assembly stations, so as to position different portions of cable at the plurality of connector feed assembly stations; said step of moving the cable supply comprising moving the cable supply in a horizontal direction perpendicular to the vertical direction of advancement of the cable supply; said step of moving the cable being performed when the next-to-be-applied connector is to be attached at a connector feed assembly station different from that connector feed assembly station at which the last connector was attached.

11. The method according to claim 10, further comprising the step of initially cutting the cable before attachment of the first connector to the cable from the cable supply; and the step of terminally cutting the cable after the last connector of a cable assembly has been attached.

12. The method according to claim 7, further comprising advancing the cable a fourth time after the third connector has been attached to position and align a fourth portion of the cable at a connector feed assembly station; and attaching a fourth connector at a connector feed assembly station to the fourth portion of the cable, to provide a cable length having a plurality of connectors attached thereon along the length thereof.

13. The method according to claim 12, wherein there are provided a plurality of connector feed assembly stations, and further comprising the step of intermittently moving the cable supply in a horizontal direction to position cable portions at a desired connector feed assembly station; said step of intermittently moving the cable supply being carried out when the last connector has been attached at one connector feed assembly station and the next connector to be attached is at another connector feed assembly station.

14. The method according to claim 13, said method further comprising the step of terminally advancing the cable after the last connector has been applied to the cable, said step of terminally advancing comprising advancing the cable a distance that will allow terminal cutting to be carried out at that portion of the cable directly adjacent to and directly above the upper surface of the last-attached connector, so that the trailing end of the cable assembly is formed adjacent the last-attached connector.

15. A method of staking an electrical connector part to a portion of flat, multiconductor cable, in which the connector part is staked to the portion of the cable by a reciprocating piston having a piston head reciprocable within a main housing, which main housing has an opening formed in a portion of its surface thereof, said method comprising the step of supplying a connector part through the opening of the main housing into the interior of the main housing; the step of placing the connector part on the piston head as the piston head moves into alignment with the opening of the main housing in its rearward-most position; and the step of moving thereafter the piston through the interior of the main housing with the connector part placed on the head portion through the front outlet opening of the main housing into staking contact with a portion of a cable positioned thereat to stake the connector part to the cable portion positioned in front of the main housing outlet opening.

16. The method according to claim 15, wherein said step of placing the connector part on the piston head comprises moving the piston rearwardly within the main housing until the piston head is in alignment with the opening formed in the surface of the main housing.

17. The method according to claim 15, wherein said step of supplying a connector part comprises vertically dropping a connector part through an opening in the main housing formed at the top surface thereof; and said step of placing comprises holding back the connector part to be supplied next.

18. A method of adapting a piston head for handling different types, sizes, and styles of two-piece connectors, in which each connector is staked to a portion of ribbon cable by a pair of diametrically-opposed pistons, each piston having a piston head for ramming a connector portion held thereon to a portion of the ribbon cable positioned directly adjacent to the piston head, which portion of ribbon cable is positioned between the two diametrically-opposed pistons, said method comprising:

inserting a first tool die having a size and configuration suited to holding therein a first type, size, and style of a portion of a two-piece connector into a piston head of a piston used for staking the connector part to a portion of ribbon cable positioned thereat; said step of inserting comprising the step of positioning the tool die in the piston head such that the connector portion held therein has its top surface portion slightly below the plane in which the ribbon cable is to be cut by cutting ~~blades~~ to form a completed ribbon cable assembly with connectors thereon, such that the ribbon cable is cut in close proximity to the outer surface of the connector attached last to the ribbon cable to prevent exposed and overhanging conductors; and cutting the portion of ribbon cable directly above and in close proximity to the upper portion of the last connector attached to the ribbon cable portion to form the trailing end of cable assembly.

19. The method according to claim 18, further comprising the step of attaching at least one connector to at least one portion of the ribbon cable positioned at the piston head in which is placed the first tool die; said step of attaching at least one connector being performed before said step of cutting the portion of ribbon cable.

20. The method according to claim 19, further comprising:

the step of removing the first tool die from the piston head; and the step of inserting a second tool die having a size and configuration different from the first tool die to hold a second type, size, and style of a portion of a two-piece connector different from the first type into the same piston head as in said step of inserting a first tool die; said step of removing and said step of inserting a second tool die each being performed after said step of cutting the portion of ribbon cable, whereby different types, sizes, and styles of two-piece connectors may be accommodated in the very same ramming piston and still ensure that the ribbon cable will be cut directly adjacent to and in very close proximity to the outer portion of the last-attached two-piece connector.

21. An apparatus for attaching electrical connector parts to a cable, the apparatus comprising:

a main housing;

a connector part retaining member for selectively retaining a connector part therein, the connector part retaining member being operatively connected with the main housing for reciprocating displacement relative thereto;

reciprocating means for reciprocating the connector part retaining member relative to the main housing at least between a connector part receiving position and a connector part attaching position for attaching the connector parts with the cable;

a connector part magazine operatively connected with the main housing and disposed adjacent the reciprocating connector part retaining member for selectively supplying connector parts thereto in the connector part receiving position, whereby the reciprocating connector part receiving member receives a connector part from the magazine and advances the connector part toward an attaching position of the cable.

22. An apparatus for continuously and automatically forming cable assemblies, the apparatus comprising:

a main frame assembly;

a cable supply supporting means for supporting a supply of multiconductor cable thereon, the cable supply supporting means being operatively connected with the main frame assembly;

cable advancing means for advancing the multiconductor cable downward from the cable supply multiconductor, the cable advancing means being operatively connected with the cable supply supporting means;

at least one connector attachment station for selectively attaching two-piece connectors to the multiconductor cable advanced by the advancing means, the connector attachment station including:

a pair of oppositely disposed ram-type connector feed devices, one of said pair of ram-type connector feed devices being operatively supported by the main frame assembly on one side of the multiconductor cable advanced by the advancing means, and the other of said pair of ram-type connector feed devices being operatively supported by the main frame assembly on the other side of the multiconductor cable advanced by the advancing means such that said pair of feed devices are diametrically opposed and aligned with each other; each of said pair of feed devices having a magazine storing therein a plurality of connector halves in an array, a main housing upon which is mounted said magazine in an operative relationship therewith, and a reciprocal piston mounted for reciprocal movement within said main housing; said piston having a head portion that reciprocates within said main housing between a forward position forward of said magazine and a rearward position rearward of said magazine; said main housing having an access opening over which the magazine is mounted to allow communication between said magazine and the interior of said main housing, whereby a connector half may be positioned one at a time in said head portion of said piston each time said piston is reciprocated rearwardly past said access opening of said magazine from its forward position; said head portion having means for retaining therein a connector half dropped therein while moving rearwardly past said access opening; each of said pair of opposed ram-type connector feed devices further comprising a piston drive means operatively connector to said piston for reciprocating said piston in said main housing, said piston drive means of each of said pair of ram-type connector feed devices applying sufficient pressure to each piston head to stake connector halves together with a cable portion sandwiched therebetween, to thus form a single connector unit attached to the cable.

23. The apparatus according to claim 22, wherein said piston drive means of each said pair of feed devices comprises adjusting means for varying the stroke of the piston, said adjusting means being mounted outside of and rearwardly of said main housing; and further comprising a pre-programmed microprocessor to actuate said piston drive means of each of said pair of feed devices to attach a connector to the cable when the cable has been moved to a precise location adjacent the opposed pistons where a connector is to be attached.

24. A device for attaching two-piece connector blocks to a cable, in which each two-piece connector block has a bottom housing half and a top cover half fastenable together by means of pins projecting from the bottom housing half, which pins pierce the insulation of the cable and contact at least one of the conductors in the cable, comprising:

a main frame having a horizontal support plate upon which are mounted structural elements; said support plate having a slotted opening formed therethrough for passage of cable therethrough;

a first ramming means mounted on said support plate on one side of said slotted opening;

a second ramming means also mounted on said support plate on the other side of said slotted opening in a diametrically opposed and horizontally aligned relationship with respect to said first ramming means;

each of said first and second ramming means having a main housing, and a reciprocable piston mounted for horizontal reciprocable movement in said main housing;

said piston of each of said first and second ramming means comprising means thereon for retaining a connector half supplied thereto;

means on said support plate for mounting said piston of each of said first and second ramming means for horizontal reciprocable movement in its respective main housing toward and away from the other said piston; and means mounted to said support plate for advancing ribbon cable through said slotted opening between said first and second ramming means in a vertically-downward direction, whereby different portions of the ribbon cable may be provided with a two-piece connector block.

25. The apparatus according to claim 22 further including translating means operatively connected to the main frame assembly for intermittently causing horizontal translating movement between the cable supply supporting means and the at least one connector attachment station.

26. The apparatus according to claim 22, wherein said means for retaining comprises a removable insert adapted to hold the outer configuration of a connector half corresponding to the connector halves in the associated magazine.

27. The device for attaching two-piece connector blocks to a cable according to claim 24, further comprising a first storage means operatively associated with said first ramming means; a second storage means operatively associated with said second ramming means; each of said first and second storage means comprising a magazine for storing like connector halves, said magazine having an access opening through which a connector half exits; each of said first and second storage means being mounted to a respective main housing of said first and second ramming means, said main housing of each of said first and second ramming means having a cooperating opening formed therein at which a respective magazine is mounted so that a connector half may exit from said access opening through said cooperating opening, whereupon movement of said means for returning of said piston in its respective main housing past said cooperating opening a connect half is fed thereto.

28. The device according to claim 24, wherein said piston of each of said first and second ramming means comprises a head portion for receiving said means for retaining; said piston further comprising a curved cutout portion on the upper surface thereof upon which the lower-most connector half in an associated magazine rides as said piston moves to attach its connector half to its mating half.

29. An apparatus for continuously and automatically forming cable assemblies, each cable assembly comprising a precise length of flat multiconductor cable and at least one connector attached to the cable at at least one precise location along the length of the cable, said apparatus comprising:

a main frame having a support surface for mounting other structure thereto;

a cable supply means for storing and paying out cable thereon;

cable supply supporting means having a first end connected to and supported by said support surface of said main frame, and a second end remote from said first end and supporting thereon said cable supply means, said second end of said cable supply supporting means lying at a higher elevation relative to said first end, so that cable is paid out from said cable supply means in a vertically downward direction;

means operatively associated with said cable supply means and mounted by said cable supply supporting means for advancing cable from said cable supply means in said vertically downward direction toward said support surface of said main frame;

a plurality of connector feed assembly stations for attaching connectors to precise locations on the cable mounted on said support surface of said main frame, so that cable from said cable supply means is directed theretowards; each of said plurality of connector feed assembly stations comprising means for attaching connectors to the cable at precise locations thereon, whereby cable assemblies of precise length may be produced with each cable assembly having connectors attached at precise locations along the length of the cable assembly; said plurality of connector feed assembly stations being mounted in-line upon said support surface of said main frame; and means for intermittently translating said cable supply means in a horizontal direction parallel to said support surface; said means for intermittently translating being mounted to said cable supply supporting means, so that said cable supply means may be moved in rectilinear, straight line motion to position said cable supply means above a chosen one of said plurality of connector feed assembly stations;

said support surface of said main frame comprising an elongated slotted opening through which cable from said cable supply means may move; said plurality of connector feed assembly stations being mounted along at least one edge of said slotted opening so as to act upon cable portions positioned thereat.

30. The apparatus according to claim 29, wherein said means for advancing cable comprises a pair of rollers forming a nip therebetween for the passage of cable therethrough, and a drive motor operatively connected to one of said pair of rollers to thereby drive said one roller and, therefore, the cable positioned between the pair of rollers; said pair of rollers and said drive motor being supported by said cable supply supporting means.

31. The apparatus according to claim 29, wherein said means for advancing cable comprises a pair of rollers forming a nip therebetween for the passage of cable therethrough, and a drive motor operatively connected to one of said pair of rollers to thereby drive said one roller and, therefore, the cable positioned between the pair of rollers; said pair of rollers and said drive motor being mounted directly to said means for intermittently translating said cable supply means; said pair of rollers being mounted directly below said cable supply means, so that the cable may be paid out in said vertically downward direction.

32. The apparatus according to claim 29, wherein each of said plurality of connector feed assembly stations comprises a first feed device mounted on one side of said slotted opening, and a second feed device mounted diametrically opposite to said first feed device on the other side of said slotted opening in an aligned configuration; the first feed devices of said plurality of connector feed stations being mounted on said support surface in a linear, straight-line array, on said one side, and the second feed devices of said plurality of connector feed assembly stations being mounted on said support surface in a linear, straight-line array on said other side.

33. The apparatus according to claim 29, wherein said means for advancing cable is mounted directly above said slotted opening, so that cable payed out from said cable supply means may pass through said slotted opening.

34. The apparatus according to claim 24, wherein said means for advancing comprises a pair of rollers forming a nip therebetween through which cable passes downwardly toward said slotted opening, said nip being positioned directly above said slotted opening and midway of the width thereof, so that cable transported downwardly into said slotted opening will pass through the central portion thereof; and drive means operatively associated with one of said pair of rollers for rotating said one roller to pay out cable thereby from said cable supply means.

35. The apparatus according to claim 32, wherein each of said first and second feed devices comprises ramming means for ramming a connector half into engagement with its mating half directly above said slotted opening and midway thereof with the cable sandwiched therebetween, said first feed device and said second feed device being aligned diametrically opposite to each other on diametrically opposed sides of said slotted opening.

36. A device for attaching electrical connector parts to portions of a cable positioned in operative alignment thereat, comprising:

a main housing;

a piston reciprocably mounted within said main housing for movement therein;

means for mounting and driving said piston for reciprocable movement within said main housing, said means for mounting and driving said piston being operably connected with said main housing;

said piston having a forward head portion comprising means for retaining therein a connector part for movement with said piston, and a cut-out surface portion extending rearwardly from said forward head portion to a portion between the forward and rearward ends of said piston; said cut-out surface portion having an inclined section thereof extending forwardly from its rearward-most extension along said piston to at least a portion of said piston between said rearward-most extension of said inclined section and said head portion; said inclined section inclining in a direction from the forward end of said piston to the rearward end of said piston;

said main housing having an opening formed therethrough at a portion thereof to allow for the insertion of a connector part onto said head portion of said piston; and means operatively associated with said main housing for supplying connector parts to said head portion of said piston one at a time through said opening; said means for supplying connector parts supplying one connector part to said head portion of said piston for every one forward stroke of said piston, whereby a portion of a cable positioned forward of and in alignment with said head portion of said piston may be provided with a connector part attached thereto at the portion thereof.

37. The device according to claim 36, wherein said means for supplying comprises a storage magazine storing therein a plurality of connector parts, said storage magazine having an outlet opening through which the connector parts exit; said storage magazine being mounted directly to said main housing, so that said outlet opening of said storage magazine is positioned directly adjacent to and in operative communication with said opening of said main housing, whereby connector parts fed from said magazine through said outlet opening and through said opening of said main housing are placed directly onto said head portion of said piston.

38. The device according to claim 37, wherein said opening of said main housing is on a portion of the upper surface thereof; and said storage magazine is mounted vertically upright over said opening of said main housing, so that connector parts may be fed to said head portion by use of the force of gravity.

39. The device according to claim 37, wherein said means for retaining a connector part of said head portion comprises a receptacle well, and adapter means for said receptacle well; said adapter means providing a seat for a connector part supplied thereto such that the connector next in line to be supplied to said head portion still has a portion thereof within the confines of said storage magazine, so that as said piston head is moved relative to said storage magazine with a connector part retained therein, the next connector part to be applied to said head portion rides along said cut-out surface portion and is still restrained within said storage magazine.

40. The device according to claim 36, comprising a pair of said devices for attaching electrical connector parts to portions of a cable; and a frame having a support surface; said pair of devices being mounted diametrically opposite to each other upon said support surface, so that cable portions fed thereto are sandwiched between said pair of devices between said piston heads thereof, whereby one of said pair of devices attaches one part of an electrical connector to one side of a cable, and the other of said pair of devices attaches another part of the electrical connector to the other side of the cable.

41. The device according to claim 36, wherein said means for mounting and driving said piston comprises means for varying the stroke of said piston within said main housing, so that different types and sizes of electrical connectors may be accomodated.

42. A device for attaching electrical connector parts to portions of cable, comprising:

a main housing;

a piston reciprocably mounted within said main housing for movement therein;

means for mounting said piston for reciprocable movement within said main housing;

said piston having a forward head portion for receiving therein a connector part, said head portion having means for retaining the connector part therein;

means controlled by the movement of said piston and connected therewith for supplying connector parts to said piston head one at a time for every one forward stroke of said piston; and a storage magazine mounted to said main housing for storing therein connector parts in order to supply them to said head portion of said piston, said storage magazine having an outlet opening through which said connector parts exit, and said main housing comprising an opening formed through a portion of one of its surfaces, said magazine being mounted to said main housing at said one portion so that said outlet opening and said opening of said main housing are in operative alignment for communication therebetween to allow the passage of the connector parts through said outlet opening and then through said opening of said main housing directly onto said head portion of said piston; whereby a connector part may be attached to a cable positioned forward of said head portion.

43. The device according to claim 42, wherein said means for supplying connector parts one at a time through said outlet opening comprises means on said piston on the surface thereof facing toward said opening of said main frame for preventing the bottom-most connector part in said storage magazine from exiting completely through said opening of said main frame when said piston head is forward of said opening of said main frame during its stroke.

44. An apparatus for automatically forming cable assemblies, each cable assembly including a selected length of flat, multiconductor cable with at least one connector attached thereto, the apparatus comprising:

a main frame assembly including at least one track member;

a cable supply support assembly mounted on the main frame track member for translating movement therealong;

a cable supply means for storing and paying out flat multiconductor cable thereffrom, the cable supply means being mounted on the cable supply supporting assembly such that the multiconductor cable pays out vertically downward therefrom;

a cable advancing means for advancing the multiconductor cable vertically downward from the cable supply means, the cable advancing means being mounted on the cable supply support assembly vertically below the cable supply means;

a translating means for selectively translating said cable supply supporting assembly along the main frame track member, the translating means being operatively connected with the main frame assembly;

a plurality of connector attaching means each for attaching a selected type of connector to the multiconductor cable, the connector attaching means being stationarily mounted in a generally horizontal array to the main frame assembly vertically below the cable supply means and the cable advancing means such that translating the cable supply supporting assembly along the main frame track member selectively positions the multicondictor cable adjacent each of the connector attaching means; and, control means for selectively causing the translating means to translate the cable supply supporting assembly to preselected positions along the main frame track member such that the payed out multiconductor cable is disposed adjacent each of the connector attaching means, for controlling the advancing means for selectively controlling advancement of the cable, and for controlling the connector attaching means for selectively causing attachment of selected types of connectors at selected locations along the multiconductor cable.

45. The apparatus according to claim 44 further including a cutting means for selectively cutting the flat, multiconductor cable, the cutting means being operatively supported by the main frame assembly among the generally horizontal array of connector attaching means, the cutting means being operatively connected with the control means to be selectively actuated thereby to cut the advanced multiconductor cable to selected lengths.

46. The apparatus according to claim 44 wherein the advancing means includes a pair of rollers forming a nip therebetween for passage of the flat, multiconductor cable therethrough and a drive motor operatively connected with at least one of the rollers for supplying rotational force thereto.

47. An apparatus for attaching two-piece connector blocks to a cable, the apparatus comprising:

a main frame assembly which defines a passage for the movement of a cable therethrough;

a first magazine for storing a plurality of first connector block halves and a second magazine for storing a plurality of second connector block halves, the first and second magazines being supported by the main frame assembly on diammetrically opposite sides of the cable receiving passage;

first and second reciprocating connector block attachment members, the first and second reciprocating attachment members being operatively supported by the main frame assembly for reciprocating movement between a connector block half receiving position and a generally abutting relationship with each other; the first reciprocating member including a first connector half retaining means and being mounted adjacent the first magazine to receive first connector block halves therefrom in its receiving position; and the second reciprocating member including a second connector half retaining means and being mounted adjacent the second magazine to receive second connector halves therefrom in the second position, whereby the first and second reciprocating members receive first and second connector block halves in one position and reciprocate carrying the connector block halves therewith to the substantially abutting relationship for insertion into a cable disposed in the cable receiving passage therebetween.

48. An apparatus for forming multiconductor cable assemblies, the apparatus comprising:

a main frame assembly;

a cable supply means for storing and paying out cable;

an advancing means operatively associated with the cable supply means for selectively advancing selected lengths of cable vertically downward therefrom;

a plurality of connector attachment stations for selectively attaching connectors to cable received thereadjacent, the attachment stations being operatively connected in a linear array along the main frame assembly below the advancing means to receive cable advanced therefrom; and, a translating means operatively connected to the main frame assembly for intermittently translating the cable supply means horizontally for selectively positioning the advanced cable adjacent each of the connector attachment stations, whereby the cable is advanced selected lengths vertically and translated horizontally adjacent selected cable attachment stations for the attachment of a plurality of selected connectors thereto at selected lengths therealong.

* * * * *